United States Patent
Wang et al.

(10) Patent No.: US 7,144,236 B2
(45) Date of Patent: Dec. 5, 2006

(54) TIRE CURING BLADDER

(75) Inventors: Yang Wang, Twinsburg, OH (US); Ikechukwu Joel Okoye, Akron, OH (US); Alfonso Quijano, Uniontown, OH (US); Susan Lynn Ashton, Cuyahoga Falls, OH (US); Ching-Chih Lee, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 151 days.

(21) Appl. No.: 10/924,110

(22) Filed: Aug. 23, 2004

(65) Prior Publication Data

US 2006/0040006 A1     Feb. 23, 2006

(51) Int. Cl.
*B29D 30/06* (2006.01)

(52) U.S. Cl. .......................................... 425/52; 425/43

(58) Field of Classification Search ................. 425/43, 425/52; 264/315
See application file for complete search history.

(56) References Cited

U.S. PATENT DOCUMENTS

| | | | |
|---|---|---|---|
| 3,647,598 A | 3/1972 | Gazuit | 156/415 |
| 3,932,255 A | 1/1976 | Saracsan | 156/401 |
| 3,963,394 A | 6/1976 | Shichman et al. | 425/51 |
| 3,990,930 A | 11/1976 | Schmit | 156/123 |
| 4,087,307 A | 5/1978 | Head et al. | 156/401 |
| 4,197,064 A * | 4/1980 | MacMillan | 425/52 |
| 4,776,781 A | 10/1988 | Sakai | 425/48 |
| 5,205,978 A * | 4/1993 | Ushikubo et al. | 264/315 |
| 5,580,513 A | 12/1996 | Patitsas et al. | 264/501 |
| 6,129,812 A | 10/2000 | Sanders | 156/401 |
| 6,824,724 B1 | 11/2004 | Mori et al. | 264/315 |

FOREIGN PATENT DOCUMENTS

| | | | |
|---|---|---|---|
| EP | 0 502 625 A2 | | 9/1992 |
| JP | 57-32932 | | 2/1982 |
| JP | 61-189909 | * | 8/1986 |
| JP | 9-1692 | | 1/1997 |
| JP | 10-34765 | | 2/1998 |
| JP | 2003-231128 | | 8/2003 |

* cited by examiner

*Primary Examiner*—James P. Mackey
(74) *Attorney, Agent, or Firm*—Nancy T. Krawczyk

(57) ABSTRACT

An expandable bladder for shaping a pneumatic tire to be mounted inside a tire curing press has a pair of opposing annular beads and an expansion portion located between the pair of annular beads. The expansion portion of the bladder has a central portion, shoulder portions, and sidewall portions. When the bladder is in a mounted but uninflated mode, the shoulder portions have a radius of curvature less than infinity. At a distance (x) from each end of the central portion, the bladder has an increased thickness in the shoulder and upper sidewall portions.

13 Claims, 3 Drawing Sheets

TIRE CURING BLADDER

FIELD OF THE INVENTION

The present invention is directed towards a tire curing bladder. More specifically, the present invention is directed towards a curing bladder used in the tire curing press, wherein the bladder gauge is optimized for improved life and curing.

BACKGROUND OF THE INVENTION

Conventionally, pneumatic rubber vehicle tires are produced by molding and curing a green (uncured) partially shaped tire in a molding press. The green tire is pressed outwardly against a mold surface by means of an inner fluid-expandable bladder. By this method, the green tire is shaped against the outer mold surface that defines the tire tread pattern and configuration of the sidewalls. By application of heat and pressure, the tire is molded and cured at elevated temperatures.

In general practice, the expansion of the bladder is accomplished by application of internal pressure to the inner bladder cavity which is provided by a fluid such as a gas, hot water and/or steam which also may participate in the transfer of heat for the curing or vulcanization of the tire. The tire after molding and curing is allowed to cool somewhat in the mold, sometimes aided by adding cold or cooler water supplied to the bladder. Then the mold is opened, the bladder is collapsed, including release of its internal fluid pressure, and the tire is removed from the tire mold. Such use of tire curing bladders is well known to those having skill in the art.

During the expansion phase of the bladder, there is relative movement between the outer contacting surface of the bladder and the inner surface of the uncured tire. A cross sectional view of conventional tire curing bladder 100 is illustrated in FIG. 3; the bladder 100 has a toroidal shape, open at the inner side. The bladder has opposing bead regions 102 and an expansion area 104 between the bead regions 102. The bead regions are provided with means to secure the curing bladder to the press mechanism, enabling the bladder to expand outwards and into a green tire. The expansion area 104 is located between the bead regions and is characterized by a constant thickness.

SUMMARY OF THE INVENTION

The present invention is directed towards an elastomeric curing bladder used in a tire curing press. The bladder configuration has been selected to reduce strain in the shoulder and sidewall portions of the bladder, reducing bladder strain and improving tire uniformity and extending the useful life of the curing bladder.

The invention disclosed is an expandable bladder for shaping a pneumatic tire to be mounted inside a tire curing press. The expandable bladder has a toroidal configuration and has a pair of opposing annular beads and an expansion portion located between the pair of annular beads. The expansion portion of the bladder may be defined as having a central portion, shoulder portions, and sidewall portions. To achieve reduced bladder strain in the shoulder and sidewall portions of the bladder, at a distance (x) from each end of the central portion, the bladder is increased in thickness toward the annular beads. The thickness increase may be a gradual increase in thickness extending through to the beads, may be a gradual increase in thickness in only the shoulder and upper sidewall regions, or may be a localized thickness in comparison to the central portion of the bladder.

In one disclosed aspect of the invention, the distance (x), wherein the bladder begins to increase in thickness at each shoulder region of the bladder, has a width of at least 5% of the width (F) of the central portion. Preferably, the distance (x) has a width of 15–30% of the width (F) of the central portion.

In another disclosed aspect of the bladder, the bladder central portion having a flat profile, or a radius of infinity, has a width (F) of 20 to 65% of the bladder height H. Preferably, the central portion has a width (F) of 30 to 50% of the bladder height H.

In another disclosed aspect of the invention, the central portion of the bladder has a constant thickness, and the increase in bladder thickness is not initiated until the distance (x) from the ends of the central portion.

In another disclosed aspect of the invention, wherein the ratio of the bladder thickness at the mid-section Wm to the bladder thickness at central portion is greater than 1.05. Preferably, the ratio of the bladder thickness at the mid-section Wm to the bladder thickness at central portion is in the range of 1.20 to 1.40.

In another disclosed aspect, the ratio of the maximum thickness of the bladder shoulder and sidewall portion to the bladder thickness at the central portion is greater than 1.05. Preferably, the ratio of the maximum thickness of the bladder shoulder and sidewall portion to the bladder thickness at the central portion is in the range of 1.20 to 1.50.

Definitions

The following definitions are controlling for the disclosed invention.

"Axial" and "axially" are used herein to refer to lines or directions that are parallel to the central fixed internal line of the toroidal shape.

"Radial" and "radially" are used to mean directions perpendicular and toward or away from the central fixed internal line of the toroidal shape.

"Toroidal" means having a ring-like shape characterized by a circular configuration about a fixed line internal to the ring-like shape. For the curing bladder, the fixed line is parallel to the mounting post upon which the curing bladder is secured.

BRIEF DESCRIPTION OF THE DRAWINGS

The invention will be described by way of example and with reference to the accompanying drawings in which.

DETAILED DESCRIPTION OF THE INVENTION

Figure 1:
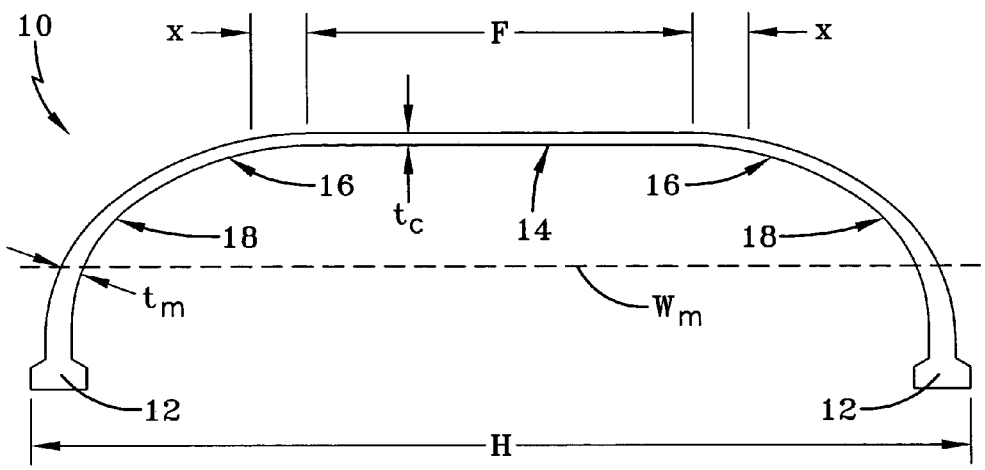
FIG. 1 is a cross sectional view of a tire bladder in accordance with the invention.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employ basically the same components with variations in location or quantity thereby giving rise to the alternative constructions in which the inventive concept can be practiced.

Figure 3:
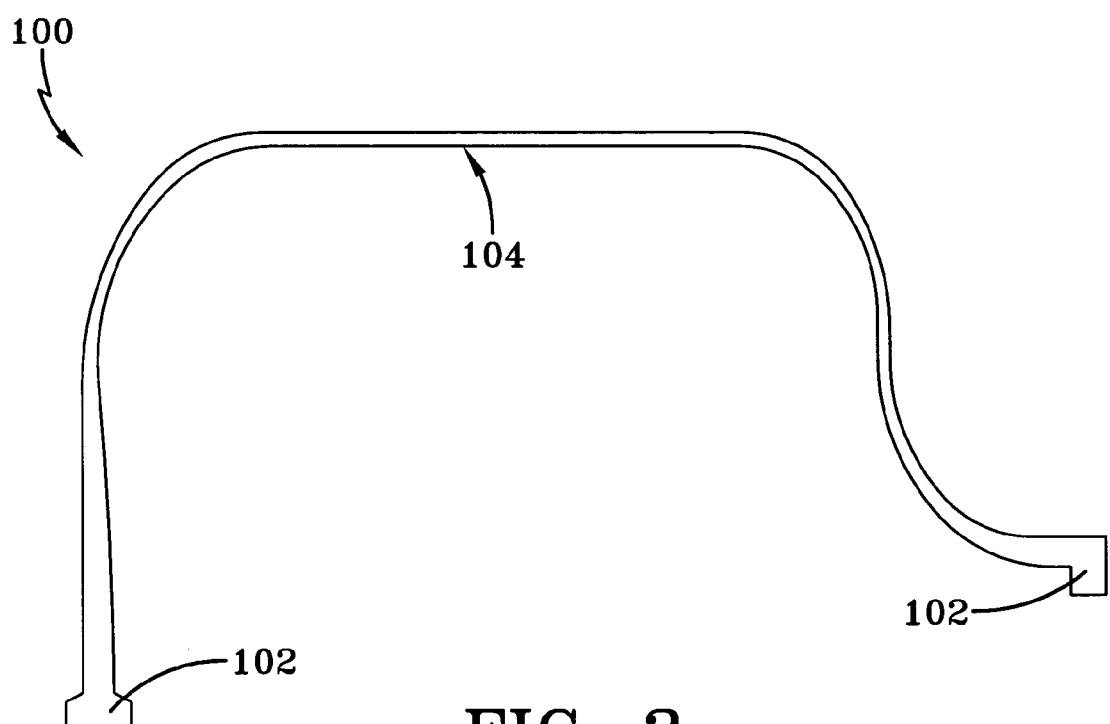
FIG. 3 is a cross sectional view of a prior art tire bladder.
Figure 4A:
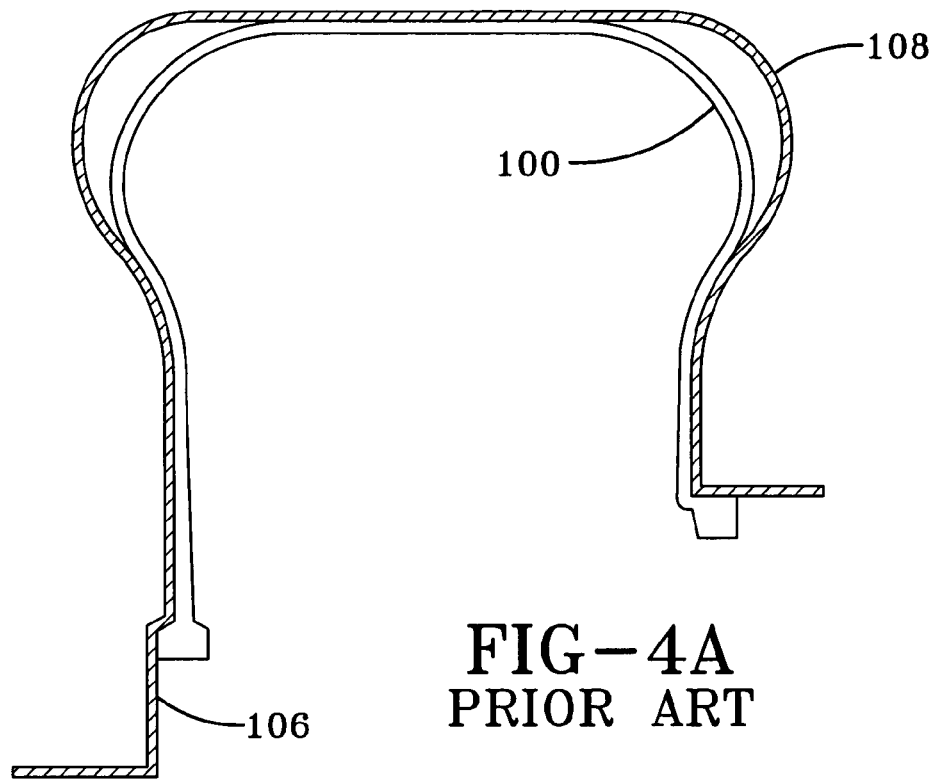
FIGS. 4A and 4B show a prior art tire bladder as it expands into the tire interior during curing.
Figure 4B:
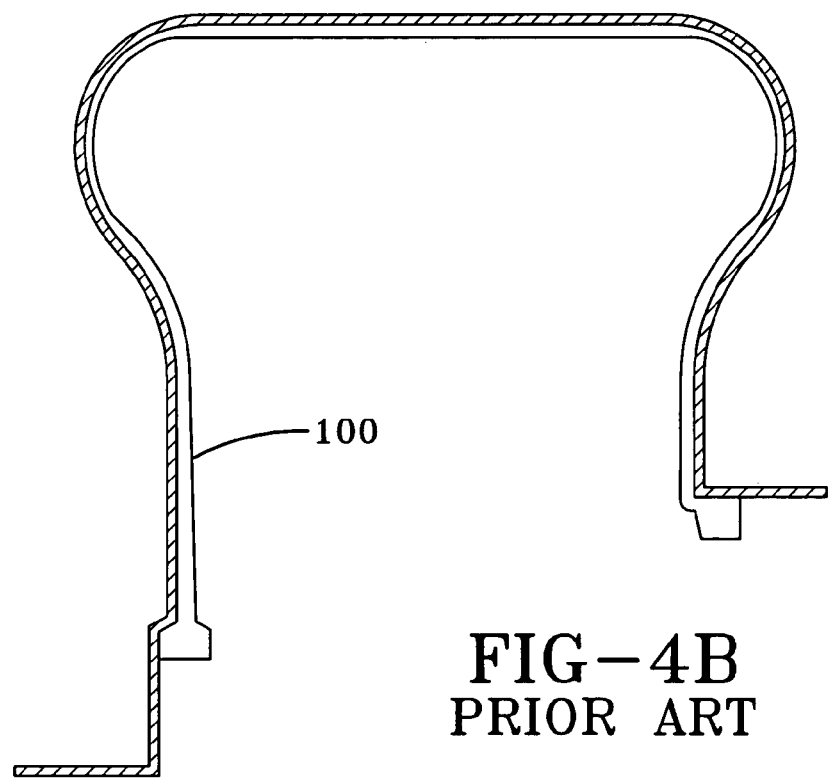

FIG. 3 illustrates a conventional asymmetric shaped tire curing bladder. The constant thickness bladder provides acceptable curing for traditional size tires; i.e. tires having aspect ratios of greater than 65. However, in the last number of years, the market has been moving towards smaller sidewall tires and low aspect ratio tires have become increasingly more common in the market. During molding of a low aspect tire, after the mold 106 is closed, pushing the bladder bead regions 102 together, as the bladder expands, the conventional bladder 100 makes initial contact in the tire tread interior region of the tire cavity 108, see FIG. 4A. As the pressure in the bladder increases, the remaining portions of the bladder 100 are pushed into the shoulder and sidewall interior regions of the tire cavity, FIG. 4B. As those remaining portions of the bladder expand into the tire cavity, the bladder thickness profile begins to vary, stressing those portions of the bladder. It was found that a bladder of uniform initial thickness has a final thickness distribution of a W shape from end to end; namely, a final thickness distribution with a maximum at the center, minimums at the shoulders, and peaks at the lower sidewall/bead areas. This thickness distribution profile leads to high bladder strain in the shoulder regions, and can result in bladder failure and non-uniform tire curing.

To overcome this failure, a new bladder configuration is required. FIG. 1 illustrates a symmetrical bladder 10 formed in accordance with the present invention. While this bladder has a symmetrical profile in comparison to the asymmetrical profile of the prior art bladder of FIG. 3, the inventive changes to the bladder to be described herein are applicable to both types of bladder configurations as will be discussed further herein. The illustrated profile is that of the bladder 10 as formed, not necessarily of the bladder 10 as mounted in a tire curing press. The bladder 10 has a thickness profile modified from the conventional bladder profile. The bladder 10 has a pair of annular retaining beads 12 for securing the bladder 10 to the curing mold (not illustrated). Between the retaining beads is the expansion portion of the bladder 10. The expansion portion of the bladder 10 has a central portion 14, shoulder portions 16, and sidewall portions 18. These portions 14, 16, 18 are defined by the following points of reference and dimensions.

The central portion 14 of the bladder 10, intended to contact the underside of a tire tread during tire curing, has a width F. The central portion 14 has a width F of 20 to 65%, preferably 30 to 50%, of the bladder height H, the bladder height H being measured between the outer edges of the bladder beads 12. The central portion 14, along its width F, is illustrated as substantially flat with no curvature, i.e. has a radius of infinity. When the central portion 14 has a flat profile, at the axially outer ends of the central portion 14, the bladder profile begins to curve and define the shoulder portions 16 of the bladder 10. If the central portion 14 has a radius of curvature, then the central portion 14 is most readily recognized by its corresponding relationship with a tire interior. The bladder central portion corresponds to that portion of the bladder that contacts the tire interior cavity radially inward of the tire tread during molding of the tire. As the tire interior cavity transitions into the tire shoulder region, so does the bladder.

The central portion 14, along its width F, has a generally constant thickness, though there may be some minor variation in thickness. At each end of the central portion 14 and at a distance x from each end of the central portion, measured from axially outward of the end of the central portion 14, the thickness of the bladder 10 is increased in each shoulder portion 16 of the bladder 10 in comparison to the central portion 14. The distance x has a width of at least 5% F, preferably 15–30% of F.

The thickness of the shoulder and sidewall portions 16, 18 gradually increases until the bladder sidewall 18 contacts the retaining beads 12, the thickness increase occurring smoothly to form a smooth continuous inner and outer bladder profile. Due to the gradual increase in thickness, the ratio of the thickness $t_m$ of the bladder 10 at the mid-section width Wm, as measured perpendicular to a normal on the bladder surface at the mid-section width Wm, to the thickness $t_c$ of the bladder 10 at the bladder central portion is greater than 1.05. Preferably, the thickness ratio $t_m/t_c$ is in the range of 1.20 to 1.40.

To reduce the weight of the bladder, the lower sidewall area of the bladder, below the mid-section width Wm, the bladder thickness may be decreased. The thickness of the lower sidewall regions is not critical to the present invention and the thickness of this lower sidewall region, adjacent to the bladder beads 12, is best optimized to reduce strain during expansion of the bladder 10.

Figure 2:
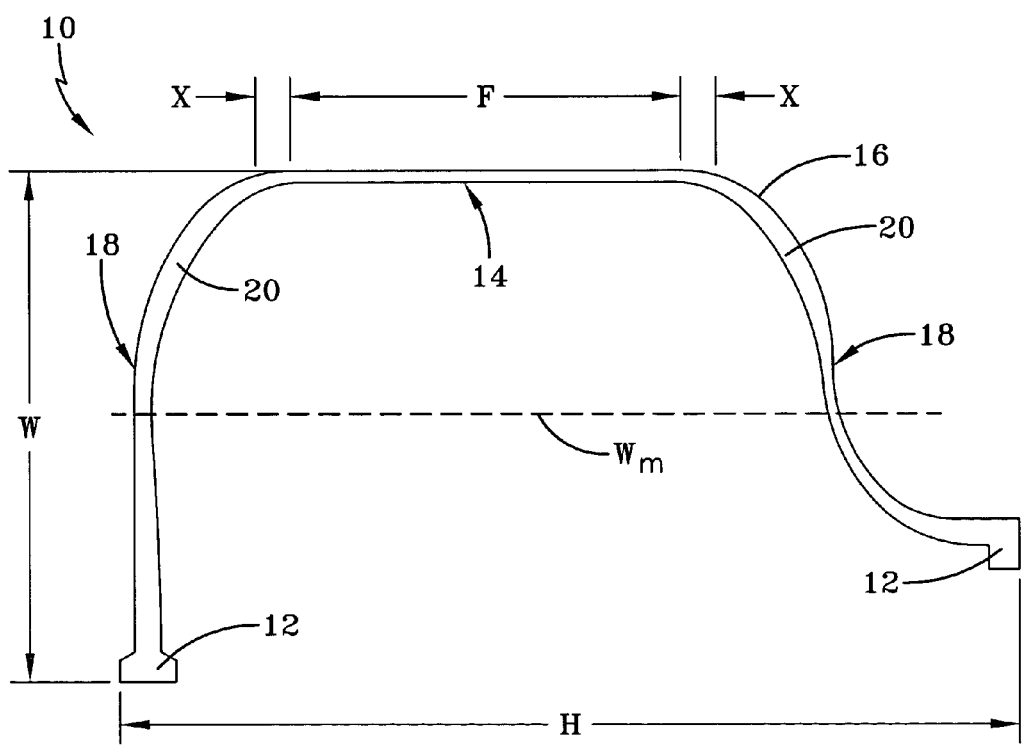
FIG. 2 is a cross sectional view of another tire bladder in accordance with the invention.

FIG. 2 illustrates an asymmetrical bladder modified in accordance with the present invention. At a distance x from the ends of the central portion 14, the shoulder portions 16 and the upper portion of the sidewall portions 18 have a localized thicker portion 20. The maximum thickness for the localized thicker portion 20 has a value of at least 1.05 times the thickness $t_c$ of the bladder 10 at the bladder center portion 14. Preferably, the maximum thickness for the localized thicker portion 20 has a value of 1.20 to 1.75 times the thickness $t_c$ of bladder center portion 14. FIG. 2 illustrates a gradual increase in the bladder thickness creating the localized thicker portion 18; however, the located thicker portion 18 may be created in a more pronounced manner and the shift in bladder thickness may be a sudden increase in thickness.

By varying the thickness profile in the disclosed methods, the bladder 10 is provided with additional thickness to permit expansion and thin areas are not generated during molding. Sample bladders were constructed in accordance with the profile seen in FIG. 1. The bladder 10 has an overall diameter of 27 inches, and a bead diameter of 16.25 inches. From the centerline of the bladder 10, counting the midpoint of the width F as interval 0, and moving towards the retaining beads, at one inch increments, the thickness of the bladder are as follows:

| Interval | Gauge, inches |
|---|---|
| 0 | 0.250 |
| 1 | 0.250 |
| 2 | 0.250 |
| 3 | 0.250 |
| 4 | 0.250 |
| 6 | 0.260 |
| 7 | 0.280 |
| 8 | 0.306 |

| Interval | Gauge, inches |
|---|---|
| 9 | 0.338 |
| 10 | 0.373 |

The bladders are mounted in curing molds for molding tires of a size P275/55R20. Each bladder was used to cure as many tires as possible until inspection of the bladder showed replacement of the bladder was necessary due to wear. The bladders had an average number of 543 cures. This is in comparison to an average number of 300 to 400 cures for a conventional cure bladder used in the same tire press. Thus, the present invention increases the cure life of the bladder.

Additionally, the tire bladders 10 of the present invention are formed from conventional expandable and durable materials, preferably rubber. The bladders may be reinforced with plies of parallel cord materials or woven fabrics. These features of a curing bladder are well known and conventional in the art of bladder forming.

The use of the improved bladder configuration results in reduced bladder wear thereby reducing overall manufacturing costs and reducing equipment down time normally required to change out the tire curing bladder.

What is claimed is:

1. An expandable bladder for shaping a pneumatic tire to be mounted inside a tire curing machine, the expandable bladder having a toroidal configuration and comprising
   a pair of opposing annular beads and an expansion portion located between the pair of annular beads, the expansion portion comprising a central portion, shoulder portions, and sidewall portions, the central portion having a generally constant thickness,
   wherein, when the bladder is in a mounted but uninflated mode, the bladder being characterized by:
   beginning at a distance (x) from each end of the central portion, and between the opposing annular beads, the shoulder portions and sidewall portions have a gradually increasing thickness.

2. The bladder of claim 1 wherein the distance (x) has a width of at least 5% of the width (F) of the central portion.

3. The bladder of claim 1 wherein the distance (x) has a width of 15–30% of the width (F) of the central portion.

4. The bladder of claim 1 wherein the ratio of a bladder thickness at the mid-section width Wm to the bladder thickness at the central portion is greater than 1.05.

5. The bladder of claim 1 wherein the ratio of a bladder thickness at the mid-section width Wm to the bladder thickness at the central portion is in the range of 1.20 to 1.40.

6. The bladder of claim 1 wherein the central portion has a width (F) of 20 to 65% of the bladder height (H).

7. The bladder of claim 1 wherein the central portion has a width (F) of 30 to 50% of the bladder height (H).

8. An expandable bladder for shaping a pneumatic tire to be mounted inside a tire curing machine, the expandable bladder having a toroidal configuration and comprising
   a pair of opposing annular beads and an expansion portion located between the pair of annular beads, the expansion portion comprising a central portion, shoulder portions, and sidewall portions, the central portion having a generally constant thickness,
   wherein, when the bladder is in a mounted but uninflated mode, the bladder being characterized by:
   beginning at a distance (x) of 5 to 30% of the width (F) of the central portion, from each end of the central portion, the shoulder portions and the upper portion of the sidewall portions have a localized increased thickness in comparison to the central portion of the bladder.

9. The bladder of claim 8 wherein the distance (x) has a width of 15–30% of the width (F) of the central portion.

10. The bladder of claim 8 wherein the maximum thickness of the localized increased thickness has a thickness value of at least 1.05 times the thickness of the central portion of the bladder.

11. The bladder of claim 8 wherein the maximum thickness of the localized increased thickness has a thickness value of 1.20 to 1.75 times the thickness of the central portion of the bladder.

12. The bladder of claim 8 wherein the central portion has a width (F) of 20 to 65% of the bladder height (H).

13. The bladder of claim 8 wherein the central portion has a width (F) of 30 to 50% of the bladder height (H).

* * * * *